United States Patent [19]

Walters

[11] Patent Number: 5,022,400

[45] Date of Patent: Jun. 11, 1991

[54] LARGE TIME BANDWIDTH ECHOGRAPHIC SIGNAL PROCESSOR

[76] Inventor: Glenn A. Walters, 917 Seph Way, Escondido, Calif. 92027

[21] Appl. No.: 153,322

[22] Filed: Feb. 8, 1988

[51] Int. Cl.$^5$ .............................................. A61B 8/00
[52] U.S. Cl. .............................................. 128/661.09
[58] Field of Search ...................... 128/661.07–661.10; 73/861.25, 620, 625–626

[56] References Cited

U.S. PATENT DOCUMENTS

| | | | |
|---|---|---|---|
| 4,182,173 | 1/1980 | Papadofrangakis et al. .... | 128/661.09 X |
| 4,320,765 | 3/1982 | Cathignol et al. ............. | 128/661.09 |
| 4,800,891 | 1/1989 | Kim ............................. | 128/661.09 |

Primary Examiner—Francis Jaworski

[57] ABSTRACT

Existing ultra-sonic echogram systems have limited resolution and contrast capabilities. The described system utilizes a pseudo-random frequency waveform and coherent signal processor to resolve image geometry simultaneously and non-ambiguously in radial distance (time) and velocity (frequency) domains. The high resolution and spectral detail provides a definitive data base for further data processing wherein vascular anomalies can be vividly displayed. Hazards associated with anesthesia, toxic injections, surgical entry and exposure to X-rays are avoided.

9 Claims, 4 Drawing Sheets

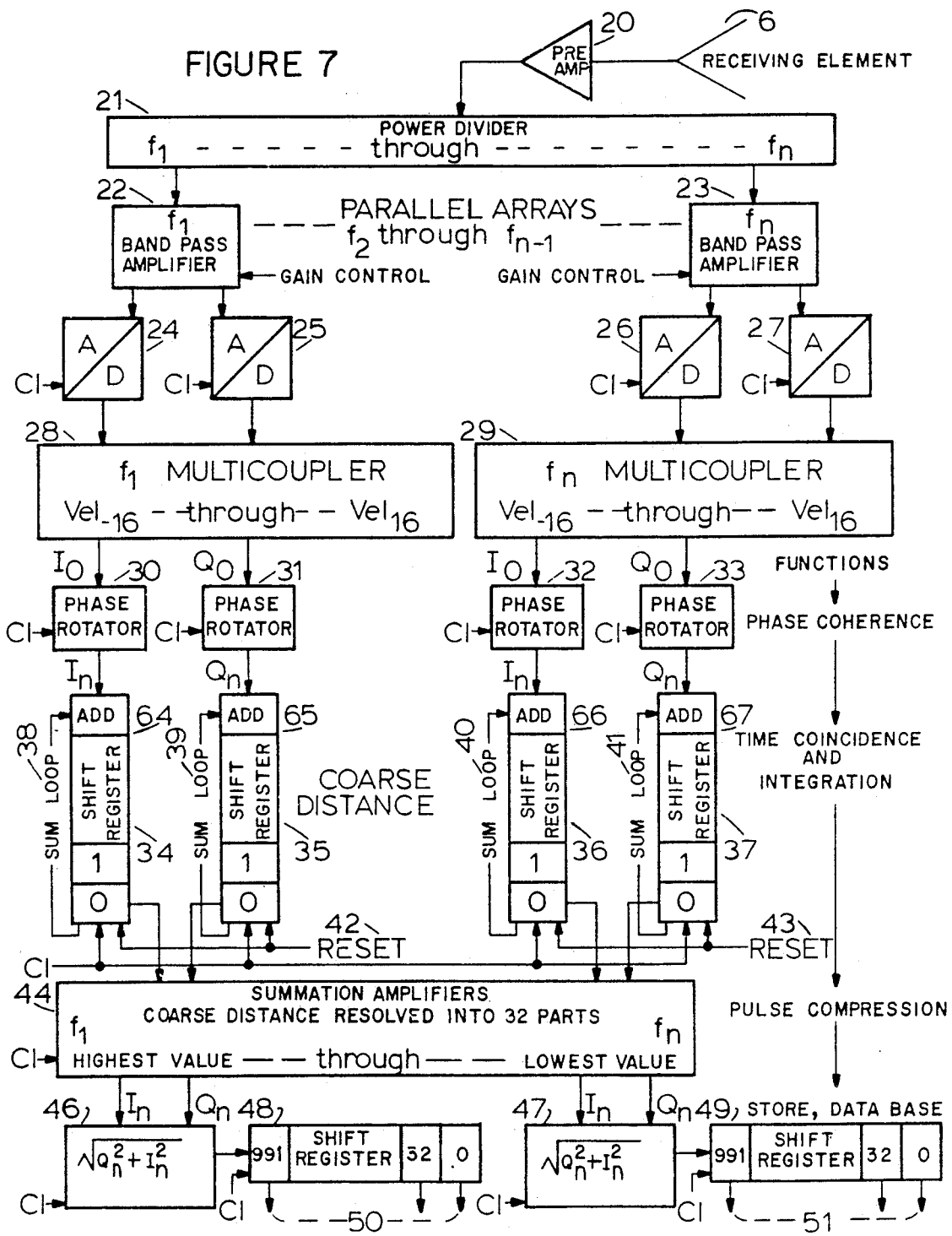

LARGE TIME BANDWIDTH ECHOGRAPHIC SIGNAL PROCESSOR

BACKGROUND OF THE INVENTION

Body imaging with sonic echo techniques is non-hazardous and cost effective. Their applications are limited by lack of sufficient resolution and contrast. In diagnosis of heart disease it is generally accepted that sonic measurements are inconclusive. Prior to heart surgery, catheterization, injection of tracer contrast elements and a multiplicity of X-rays are invariably used in preoperative diagnostics.

Existing sonic systems are two generic types: pulse and continuous wave. Inherently, the first is limited to measurements of radial range and the second to measurements of radial velocity. Dimensional resolution is inversely proportional to pulse length. Narrow pulses require high peak power. Geometric and velocity measurements are not simultaneously performed and the data is viewed separately.

Other signal waveforms and associate processes can be utilized, such as pulse Doppler, to provide measurements of distance, velocity, and pulse compression to improve geometric resolution. Distance and velocity related phase changes are cross-coupled. Either, or both, distance and velocity measurement ambiguities are introduced. The geometric resolution improvement is limited.

Sonic echo systems operate by transmitting a sonic signal into the body tissue and receiving echo signals along the transmission path from transmission impedance anomalies caused by changes in body structures. The measurement of radial distance to an anomaly is a function of the transit time between the transmission and reception of the signal. In a simple pulse system geometric resolution is inversely proportional to the pulse period; or inversely, directly proportional to the signal bandwidth. The direct proportionality is of primary importance in signal processes that increase radial distance resolution.

Radial velocity measurements are dependent upon the Doppler frequency change introduced by motion within the transmission impedance anomalies. Velocity resolution is directly proportional to the observation period.

A specific waveform and complementary signal processor capable of simultaneously detecting radial position and velocity in a non-ambiguous manner is described. Its resolving power matches theoretical capabilities; i.e., the resolution is a half wavelength of the frequency bandwidth being processed. The velocity resolution is the distance resolution divided by the signal integration time period. The finely resolved distance measurement, along with the spectral velocity information, provides the data base to image vascular anomalies, bone fractures, foreign bodies, etc.. Contrast is improved by translating velocity spectral measurements to color spectral conditioning of the image. For example, venous blood, moving towards the heart, can be colored blue and arterial blood may be colored red. Velocity gradients can be displayed by color gradation. Geometric and velocity measurements are quantitatively defined.

The purpose of this invention is to provide means for implementing a signal processor capable of providing an improved data base for subsequent data processing as required for display.

SUMMARY OF THE INVENTION

The signal waveform is a contiguous series of randomly sequenced, frequency coherent, segmented signals joined to form a continuous wave. The fundamental difference between the specific signal format disclosed herein and conventional pseudo-random signal formats is the coherent relationship, contiguous waveform, non-linear, non-periodic order of frequency segments, utilized in a given integration period. As a general statement the time duration of each frequency segment can be kept constant. Related coherency can be maintained by having the frequencies harmonically related. All signals are of equal amplitude. The signals are sent in a pseudo-random order and joined at zero crossings.

A further purpose of this invention is to extend the means disclosed herein to other applications in sonic and electromagnetic signal processor implementation.

As may be desired, the signal format can be implemented as a continuous or interrupted continuous waveform. In either case the frequency segments are sent in a pseudo-random, non-linear, non-periodic order throughout the signal integration period.

The complementary signal process involves three primary functions:

Processing echo signals, subject to like Doppler shifts (velocities), into frequency coherent channels.

Bringing echoes subject to like transit times (distance) into time coincidence.

Coherently adding all echoes from all frequency segments of a specific Doppler shift and common transit period together over a defined integration period to provide a pulse compressed measurement of the echo's radial distance and velocity.

The echo signal data is segregated into designated storage bins that simultaneously and non-ambiguously define signal returns in velocity (as related to Doppler frequency displacement) and distance (as related to pulse compressed measurements of transit time). The resolved range is one half wavelength of the signal frequency bandwidth. Velocity resolution is directly related to the range resolution divided by the integration period. The processing gain is directly related to the time-bandwidth product of the signal process.

OBJECTS OF THE INVENTION

The first object of the invention is to describe an example of a specific continuous waveform that can be transmitted.

The second object is to disclose a means for implementing the signal process and discuss related capabilities.

A third object of the present invention is to describe similar techniques for implementing an interrupted continuous wave system.

Other objects, advantages and nominal features of the invention will become apparent from the following detailed description of the invention when considered in conjunction with the accompanying drawings.

BRIEF DESCRIPTION OF THE DRAWINGS

FIG. 7 is a block diagram of the signal processor.

DESCRIPTION OF THE PREFERRED EMBODIMENT

Figure 1:
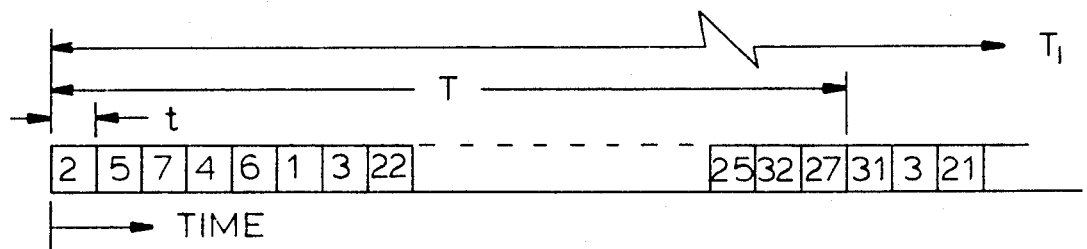
FIG. 1 describes the continuous wave signal format in terms of a pseudo-random series of frequency segments, wherein their order avoids linear sequences and time periodicity.

The transmitted sonic signal format is shown in FIG. 1. 6 It consists of a contiguous series of N (32) randomly sequenced, coherent frequency segments, $f_1$ through $f_{32}$, each segment has a period of $\tau$ microseconds. They form a range word over a period of $N\tau = T$ microseconds. Multiple range words with the same frequency segments, $f_1$ through $f_{32}$ but sequenced in a different random order, form a range word group which extends over the integration period $T_i$. The random sequence excludes periodicity (the sending of an individual frequency segment in identical time slots) and linearities (a linear progression of frequencies).

Figure 2:
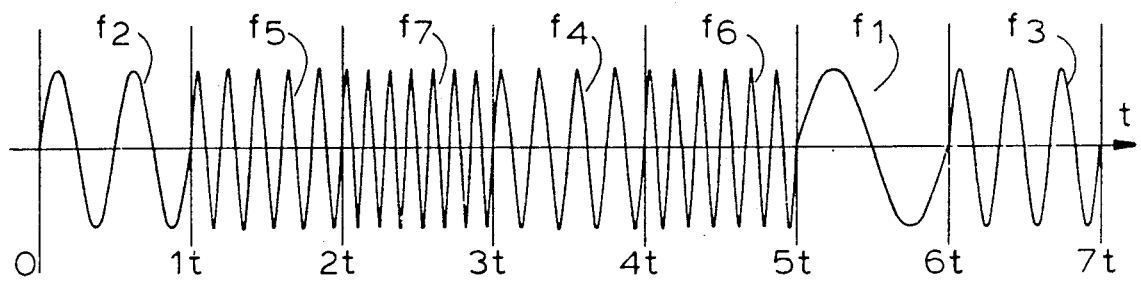
FIG. 2 describes the signal waveform.

The signal waveform is described in FIG. 2. A contiguous series infers that the frequency segments are joined at zero crossovers in a contiguous manner.

The random sequence requires that the individual frequency segments be sent in random order. Consider a group of 32 frequency segments making up a range word of coherently related signals, having a maximum frequency of 6 megahertz; then: $f_1 = 0.1875$, $f_2 = 0.375$, $f_3 = 0.5625$, ... $f_{32} = 6$ mHz.

The number of sequence permutations available with 32 discrete frequencies are: $32! - 1 = 2.63 \times 10^{35}$. To obtain a thumbtack ambiguity diagram, referring to FIG. 3, it is necessary to minimize time or frequency sidelobes rising from the floor level. Linear sequences, such as 1-2-3, 2-4-6, their multiples or reversed sequence are avoided within any range word. Furthermore, a given frequency is not periodically repeated in the same time slot in sequential range word. This eliminates a finite number of permutations. Generally, a frequency segmented word period is equal to, or greater than, the transit time to the most distant echo of interest. Each range word includes all frequency segments being utilized. Spacing between adjacent frequencies within the range word are sufficiently small as to prevent the introduction of grating lobes. For this example they are spaced at 0.1875 MHz intervals and identified by harmonic number; i.e., 1 through 32. Typically:

RANGE WORD FREQUENCY NUMBERS 2, 5, 7, 4, 6, 1, 3, 22, 17, 24, 21, 13, 18, 23, 19, 9, 14, 20, 11, 30, 16, 10, 29, 26, 15, 28, 31, 12, 8, 25, 32, 27 and continuing in a non-linear, non-periodic manner over one or more integration periods.

Frequency segmented signals infer stepped changes in signal frequencies for transmission periods that allow one or more cycles. In this example, the frequency segment period is kept constant and equal to, or somewhat greater than, one cycle period of the lowest frequency transmitted.

Coherency between signals of different frequency infer a commonality in the time/amplitude characteristics of the signal; i.e., a signal reaches its maximum amplitude at some known time after it is initiated. This is most easily described and implemented in terms of harmonically related frequencies. This bandwidth of frequencies can be related to carrier frequencies in either or both of the upper and lower sidebands.

In the exemplified implementation, all signals are of equal amplitude. Amplitude shading, as required to reduce sidelobes in the frequency and time domains, is best accomplished within the implementation of the receiver.

The signals are sent in a pseudo-random sequence as previously described. To minimize spurious signals at the step junction, it is preferred that the frequency segments be joined at zero or maximum value crossings.

The number of frequencies sent, the pulse width of the frequency segment, the coherent frequency relationship between segments and the sequence they are transmitted in are matters of design choice.

The fundamental difference between the described and conventional signal formats are the constrained pseudo-random characteristics of the waveform. In swept frequency signal formats the frequency and range induced phase changes involved in the auto-correlation process are cross-coupled. The ambiguity diagram of the described waveform-process, FIG. 3, clearly delineates spectral and range information in a non-ambiguous manner and minimizes sidelobes in the time and frequency domains.

Figure 4:
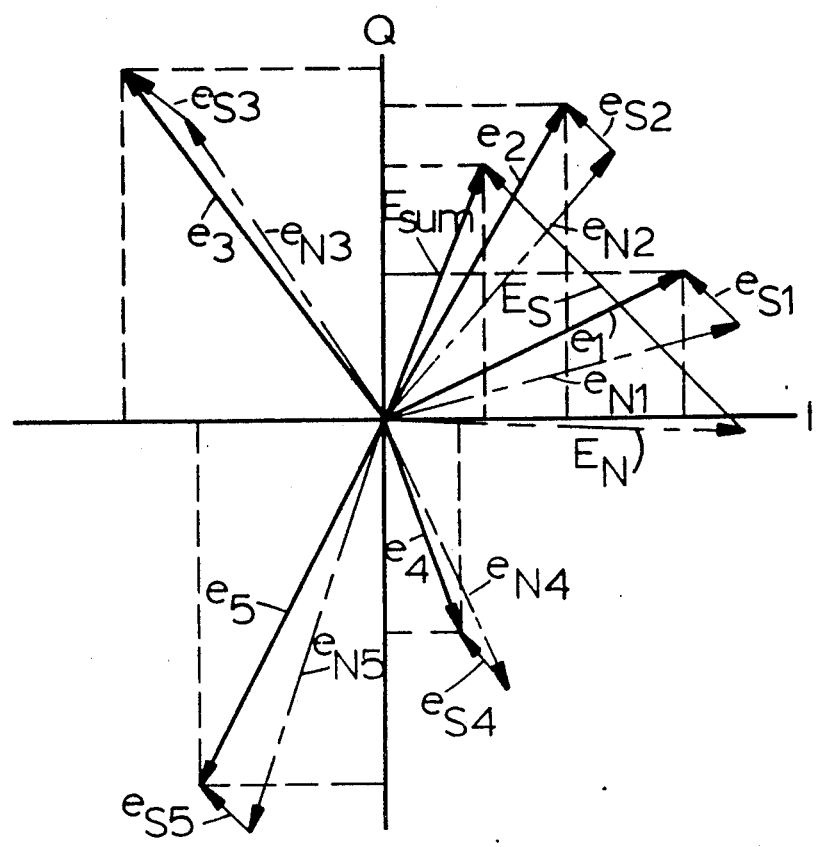
FIG. 4 descriptively shows the advantages of the coherent signal detection process in improving the signal-to-noise ratio.

This sonic signal format and complementary signal process has the capabilities of detecting signals which are below the ambient noise level. This is best described by reference to FIG. 4. Here five signal samples of noise plus signal have been received ($e_{s1}$ through $e_{s5}$). In each case the noise vector is much larger than the signal. The desired signal, in each case, retains a coherent relationship. Noise is non-coherent and random. The sum of the five signals is designated "sum". The coherently summed signal level $E_s$ exceeds the noise level $E_n$. This inherent characteristic provides processing gain that is advantageous in reducing sonic power requirements, or utilizing higher transmitted frequencies, i.e., accept greater transmission loss.

Figure 5:
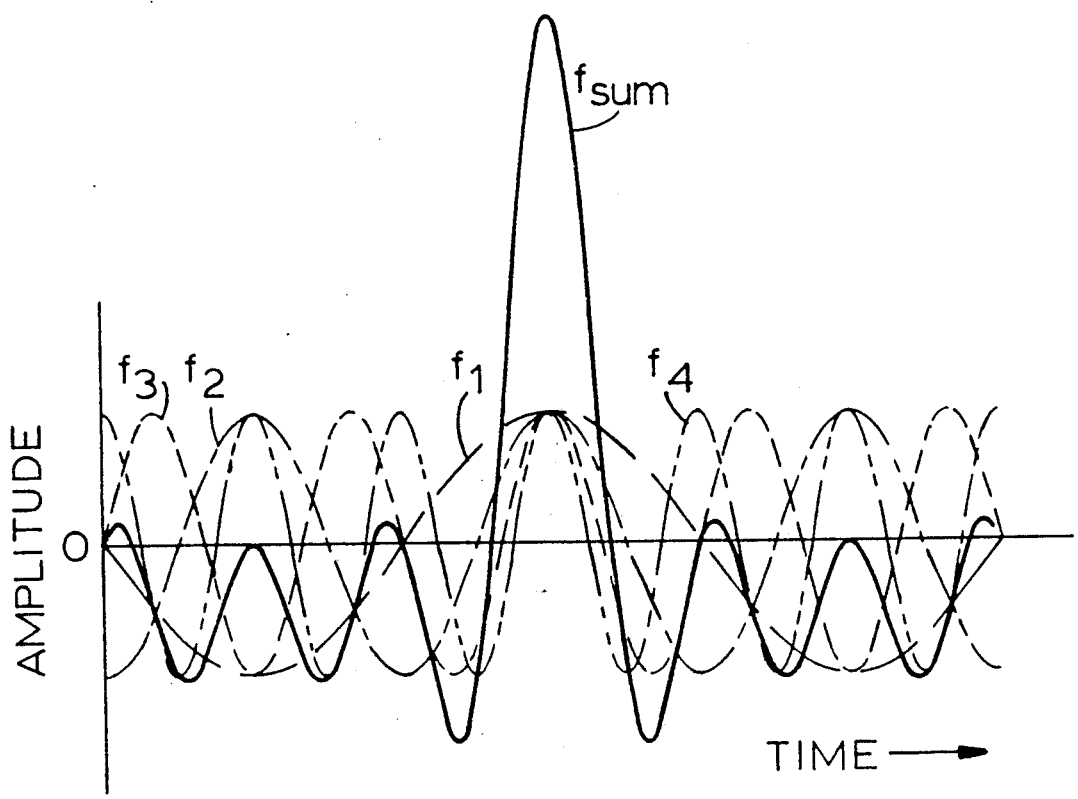
FIG. 5 provides a graphic approximation of the pulse compression technique.

A group of harmonically related signals, when brought into time coincidence, form a pulse compressed signal; refer to graphical outline in the two-dimensional picture of FIG. 5. The compression ratio is directly related to the square of the number of frequency segments used and provides improved geometric resolution. For example, at 6 mHz the acoustical half wavelength is approximately 0.005".

The velocity resolution is equal to the dimensional resolution divided by the integration period. If one were to allow a tenth second for an integration period, the velocity resolution is 0.05"/sec. Greater resolutions can be achieved with corresponding increases in time. For example, if the integration period were increased to one second, the resolution is 0.005"/sec.

Figure 3:
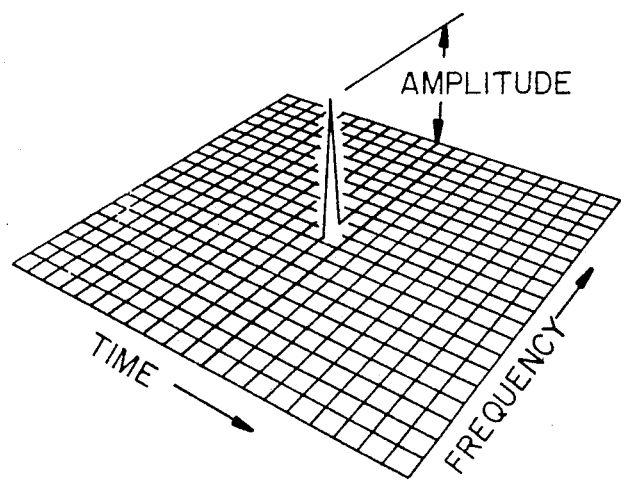
FIG. 3 graphically displays the characteristics of a thumbtack ambiguity response.

The ambiguity diagram, FIG. 3, is produced by the utilization of the described signal format in combination with its complementary signal processor. The peak amplitude of the thumbtack spike is above the average level of the noise floor by the time-bandwidth of the signals processed; i.e., $6 \times 10^6$ or 58 dB.

Figures 6, 8:
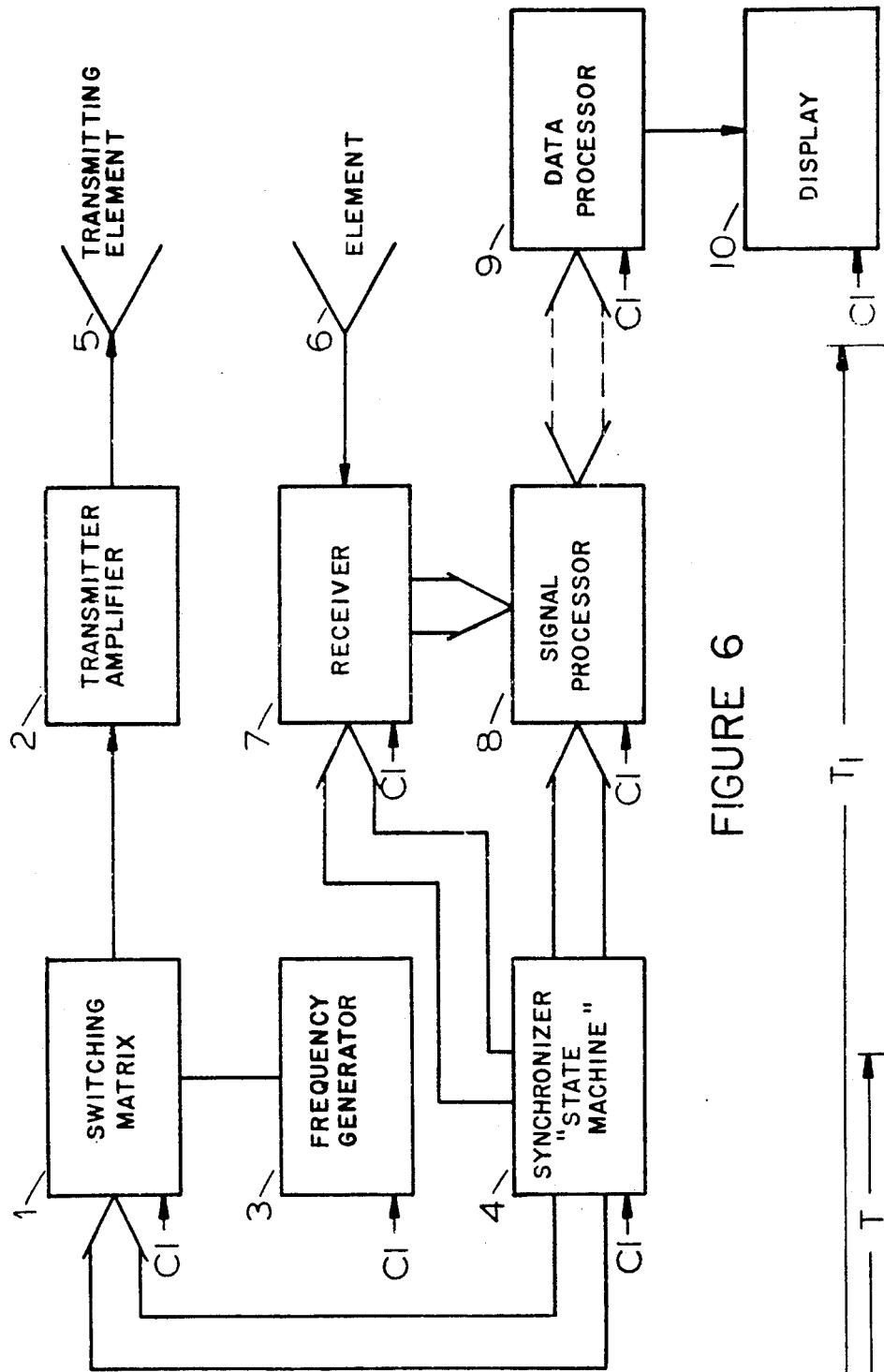
FIG. 6 is a block diagram of the system.
FIG. 8 describes the pulsed signal format in terms of a pseudo-random series of frequency segments.

A simplified diagram of the sonic echo system is shown in FIG. 6. Frequency generator 3 provides the transmitter amplifier 2 with N coherent related signals transmitted in a contiguous manner through diode matrix switch 1. An exemplary 32-bit frequency code is controlled by a 5-bit digital number as commanded by the synchronizer 4. At any instant, all but one of the frequencies is terminated in a matched resistive load. The remaining frequency is inputted to the transmitter amplifier. The existing frequency is switched off and a new frequency on at the signal zero crossover. This CW signal is amplified 2 and inputted into a wideband transducer 5 and radiated.

Separate transducers are utilized for transmitting and receiving. Details of the transducer design are dependent upon the specific application. The requirement is to minimize direct coupling between transmitting 5 and receiving 6 elements.

Echo signals are received 6, amplified 7 and through appropriate filtering, separated into N frequency channels. Output signals are divided into quadrature 'I' and 'Q' components. These analog amplitudes are then coverted into digital numbers through A to D converters and the array of signals sampled by the signal processor 8. The function of the signal processor is to sort and store echo returns from various reflections of the transmitter signal encountered along its transmission path, into storage bins that define radial distance and velocity of each individual reflection encountered. In the described example, the resolution in radial distance and velocity is 0.005" and 0.05"/sec, respectively. This is the data base for the data processor 9, which translates the signal data into desired image coordinates for display 10. Neither 9 nor 10 are part of this invention.

The signal processor can be accomplished with discrete transforms, Fast Fourier Transforms, convolutional processes or with, or in combination with, analog devices. All timing functions of the signal processor, and subsequent data processor, are controlled by the sychronizer and its associated "state machine". A block diagram of the signal processor is in FIG. 7.

Echo signals are received by element 6, amplified in preamp 20 and divided into N output signals (example 32). Each signal is then routed to individual bandpass amplifiers, typically 22 and 23. There are N number of amplifiers required to form the array processor. To simplify the presentation a typical arrangement will be exemplified. Their frequency bandpass is centered at the frequency used by the transmitted signal format. The bandpass of these amplifiers is sufficient to cover the range of Doppler frequencies related to the velocity range of interest. The output signal from each bandpass amplifier is divided into two quadrature components, 'I' and 'Q'. The amplitude in both the 'I' and 'Q' channels are then converted into digital numbers through A to D converters, typically 24, 25, 26, and 27. The amplitude of these two quadrature signals retains both magnitude and phase related quantities associated with each of the signals. It is this array of signals that is inputted into the signal array processor.

In this illustration there has been implemented ±16 Doppler frequencies corresponding to a radial velocity range of ±0.8"/sec in 0.05"/sec steps. Furthermore, for purposes of illustration, 1024 radial distance steps are implemented to cover a differential radial distance of 5.12" in 0.005" steps. The 'I' and 'Q' outputs of each frequency segment channel are inputted to multicouplers, typically 28 and 29, with ±16 or 32 'I' and 'Q' output pairs, which in turn are next inputted to phase rotators, typically 30, 31, 32, and 33.

The purpose of a phase rotator is to progressively introduce counter-rotations that rotate each band of Doppler frequencies over the integration period to its originally transmitted frequency. This restores phase coherency between frequency segments. The mathematical relationships are:

$$I_n = I_0 \cos(w_d t) + Q_0 \sin(w_d t)$$

$$Q_n = I_0 \sin(w_d t) - Q_0 \cos(w_d t)$$

$$w_d = 2\pi v f_n / c_s$$

where:
$I_0$ = amplitude of in-phase input signal at velocity v,
$I_n$ = amplitude of in-phase output signal at velocity 0
$Q_0$ = amplitude of quadrature input signal at velocity v
$Q_n$ = amplitude of quadrature output signal at velocity 0
$w_d$ = Doppler frequency at velocity v and frequency $f_N$
$f_N$ = carrier frequency of frequency segment $f_1$ through $f_N$
N = carrier frequency channel number (Ex: 32)
v = radial flow velocity within transmission anomaly (ex: blood)
$c_s$ = speed of sound in body tissue
t = time as measured by progressive clocked samples from start of the integration period to the end of the integration period Signals are sampled at $\tau$ intervals; for the example, each 5.33 microseconds. Each sample represents consecutive coarse distance measurements; resolution to 0.16". Sampling starts with each integration period (t=0) and continues over the integration period to $t = T_i$ (0.1 seconds). The outputted phase corrected zero velocity signals are now inputted to a shift register, typically 34, 35, 36, and 37, having 32 coarse distance cells. The total range of coarse distance measurements covers $32 \times 0.16''$ or 5.12". One pair of shift registers are required for each velocity range implemented; i.e., a total of 64 shift registers.

Successive range words are coherently added over the integration period; example 0.1 seconds. Frequency segmented samples of echo signals from like coarse ranges at each successive word period are sequentially looped (38, 39, 40, & 41), such that they are coherently added to incoming signals with adders 64, 65, 66, and 67. In that the phase rotation corrections are introduced from the start of an integration period, the successive phase corrections effectively transfer a radial distance measurement to its originally observed position. The integration processing gain provided is equal to the number of loop additions involved; in this example, 589 integration range word periods.

The period between successive like frequency segments is pseudo-random and non-periodic. Like frequency segments are not repeated in a word period, T. Furthermore, all frequency segments making up a word sequence are always used within the word period, T. The coarse distance measurement is directly related to signal transit time as measured from time zero at the initiation of a given frequency segment. Whenever a frequency segment is sent, the shift register is reset, 42, 43. The first $\tau$ sample is then stored in the first range cell. This brings all of the signals in a given coarse range, at any velocity implemented, into time coincidence. Timing functions such as clock, loop transfer, and reset are all initiated in the "synchronizer and state machine" 4, FIG. 6.

At the end of the integration period, the feedback loop is disabled and a new integration period started with new sampled data, from each of the frequency segments, sequentially entered into the shift register. At the same time the then stored integrated echo signal data, starting with the minimum coarse range cell of the shift register, is shifted out and inputted into summation amplifiers 44. As the new frequency segmented word proceeds, this shift register stepping programs continues, over the word period, T. Information from like coarse distance cells and like Doppler shifts (velocity) are sequentially entered into summation amplifiers 44 in the order they are sent during the first range word of the new integration period. The summation amplifiers vectorially sum the input frequency array into a time compressed pulse. Pulse compression divides this coarse range (0.16") into N parts, resulting in pulse compressed resolution (0.005").

'I' and 'Q' data, as outputted for each fine range, and inputted to a given Doppler frequency channel, are quadraturely summed 46, 47 (ex: the square root of the sum of the squares), and stored into shift registers 48, 49. Thirty-two shift registers are required, each storing 32 fine ranges. This group then stores 1024 fine ranges at the velocity $v_{-16}$. There are $\pm 16$ velocity channels outputted from the multicoupler 28, 29. The process described for channel $v_{-16}$ is repeated in parallel for all other velocities. As a result, there are 32 velocity channels, each referenced to 1024 fine range positions. This is a total of 32,769 storage bins, each containing possible echo data in terms of a radial distance and velocity measurement. This database is now available at parallel sampling outputs 50, 51 for subsequent data processing as required for image presentation and/or geometric and velocity measurements.

The continuous wave apparatus requires separate transmitting and receiving radiators, or the use of "isolator-signal cancellation couplings" in the transmitter-receiver radiator circuits. In some designs, these problems can be circumvented by using an interrupted, continuous wave signal format. Performance in terms of processing gain, transmitter peak power requirements, and time-frequency sidelobes are compromised but the resulting performance may be acceptable.

Interrupted continuous wave operation is achieved by following a range word or range word group by a period of silence. The former is illustrated in FIG. 8. The latter is generally preferred for its increased duty cycle. A typical contiguous range word group to form 8, 8 frequency range words, is tabulated below:

| Range Word No. | Frequency Segment No. | | | | | | | |
|---|---|---|---|---|---|---|---|---|
| 1 | 6 | 2 | 7 | 3 | 8 | 6 | 1 | 4 |
| 2 | 4 | 6 | 2 | 7 | 3 | 8 | 5 | 1 |
| 3 | 1 | 4 | 6 | 2 | 7 | 3 | 8 | 5 |
| 4 | 5 | 1 | 4 | 6 | 2 | 7 | 3 | 8 |
| 5 | 8 | 5 | 1 | 4 | 6 | 2 | 7 | 3 |
| 6 | 3 | 8 | 5 | 1 | 4 | 6 | 2 | 7 |
| 7 | 7 | 3 | 8 | 5 | 1 | 4 | 6 | 2 |
| 8 | 2 | 7 | 3 | 8 | 5 | 1 | 4 | 6 |

Consider a 6 MHz maximum frequency segment; $\tau = 1.33$ microseconds. A range word group composed of 64 frequency segment periods has a period of 10.33 microseconds. The transit time to a 6 inch echo range is 208 microseconds. The minimum period of silence is therefore, 123 microseconds. Eight such word groups provide a 1 millisecond integration period. Periodicity can be avoided by varying the period of silence from the minimum value of 123 microseconds to some greater value in random steps. That is, random number (rn) 2 7 4 1 6 3 5 T = 123 + 10 (rn) 143 193 163 133 183 153 173 203 microsec.

The result is minimum sidelobe levels in the time and frequency domains of the ambiguity function. Further reductions in sidelobe levels are achieved by weighting the bandpass amplifier gains in accordance with Hamming, Taylor or other applicable functions, and placing framing filters at the output of the phase rotators.

The described echography system provides a new and unique operational capability in terms of simultaneously and non-ambiguous determining an echo's range and velocity; i.e., a range gated velocity measurement. The means to achieve this operational capability are dependent upon the use of a precise constrained pseudo-random waveform, the signal processor's architecture and the efficient use of apriori information.

Requirements in terms of: range and velocity resolution and limits, integration periods, and the defined signal format become apriori information. The unknowns are echo's range and velocity. It is therefore necessary to implement a matched filter for all ranges and velocities within the range of interest.

The continuum of high speed information inputted must be processed in real time within an acceptable time delay, usually a fraction of a second. The keys to operational success is the series-parallel array processor architecture wherein apriori known algorithms and program functions are programmed within look-up tables. For example, the frequency sequence numbers for a series of word groups of sufficient length to extend over several integration periods, can be stored as look-up tables in an EPROM. Phase rotation coefficient, page 12, lines 15-17 can be similarly stored. The address and read out time period is considerably faster than achieved through algorithm calculations.

There are obviously many modifications and variations of the present invention possible in light of the above teachings. It is, therefore, to be understood that within the scope of the appended claims, the invention may be practiced otherwise as specifically described.

I claim:

1. An echography system that provides simultaneous, nonambiguous measurements of an echo's amplitude, range and velocity utilizing a pseudo-random, stepped frequency waveform, said system comprising:

transmitter means for generating and transmitting the step frequency waveform;

receiver means for receiving echoes from impedance discontinuities within the signal path of the step frequency waveform;

means for channelizing the echos from differing frequency steps of the stepped frequency waveform;

state machine means to maintain coherency between the step frequency waveform and corresponding echo waveform;

algorithm means for extracting the Doppler frequency shift introduced in the received frequency steps by echo source velocity and for deriving a velocity measurement;

accessible storage means to coherently add successive echoes of received step frequency having common Doppler frequencies and transit periods;

means to vectorally add echoes of like velocity and transit period from all step frequencies to obtain a pulse compressed signal and derive a fine range measurement;

means of storing successive measurements of echo's magnitude, range and velocity.

2. The system, according to claim 1, wherein said transmitter means transmits a continuing step frequency waveform, and wherein:

the continuous waveform is composed of consecutive series transmitted in a pseudo-random sequence of a fixed number of step frequencies;

each step frequency is transmitted once in each consecutive series; and coherency between step frequencies are coherently related by commonality within their individual time/amplitude signatures.

3. The system of claim 2, wherein:

said transmitter means achieves coherency between segments through the utilization of a fixed number of harmonically related frequencies sent in series;

each step frequency has an interger number of cycles and is transmitted once within each series; and a contiguous characteristic is formed by stepping from one step frequency to the next at either their zero or maximum voltage values.

4. The system of claim 3, wherein:

said transmitter means transmits a number of range words serially over the integration period to form a range word group;

each series of step frequencies has an linear sequences; and the pseudo-random order in sequential words series of step frequencies avoid periodicity during a given integration period.

5. The echography system as described in claim 2 wherein an interrupted continuous wave signal and wherein said transmitter means uses:

each step frequency series as described in claim 2 is followed by a period of silence; and the period of the range word transmission plus the period of silence exceeds the transit time to the furthest echo of interest.

6. The system of claim 1 wherein the transmitter means includes a waveform generator which in turn comprises:

a stable reference oscillator and associated circuits to generate coherent, continuous wave signals as required by the transmitter or receiver for the step frequencies, local oscillators, and clocking functions;

a digitally controlled switching matrix for controlling the step frequencies pseudo-random order; an accessible storage component that stores, as a look up table, the pseudo-random code command; and said access is addressed and retrieved by command from a synchronous state machine.

7. The system of claim 1, wherein:

the channelizing means channelized the received signals into frequency bands in accordance with the step frequencies transmitted; the incoming signals are multiplexed through analog filter circuits into the step frequency channels;

signals in each channel are mixed with quadrature, synchronous, local oscillator signals to provide 'I' and 'Q' (quadrature phase) signal outputs; and the voltage amplitude of the analog signal outputs is converted to a digital number.

8. The system of claim 1, comprises said algorithms means to extract Doppler frequency shifts introduced by echo source velocity, wherein:

means for entering each implemented resolved echo source velocity to phase rotation coefficients for each velocity resolution cell implemented, as a function of (observation) time during the integration period;

these phase rotation coefficients, a storage device, as look-up tables; said coefficients, being retrieved by the (synchronous) state machine; and means for contracting a phase rotated array to extract related induced Doppler frequency phase shifts.

9. The system of claim 1, wherein the algorithm means for extracting Doppler shift induced by echo source velocity is comprised of:

means that equates range rate (velocity) of the echo source to changes in time of arrival of the step frequency waveform;

said changes in time of arrival, as a function time from the initiation of a given integration period, being computed for velocity resolution cells between defined limits are entered into an accessible storage component;

means for introducing progressive advance or delay in clocked sampling period as required to track range advances (closing velocity) or lag (opening velocity) incremental range changes induced by target velocity;

throughout the integration period, the echo, so processed, is characterized as a stationary target at its initial observed range throughout a given integration period; and said state machine controlling said clocking sampling changes by the stage machine.

* * * * *